United States Patent [19]

Lewis et al.

[11] Patent Number: 4,596,528
[45] Date of Patent: Jun. 24, 1986

[54] SIMULATED SKIN AND METHOD

[76] Inventors: Leonard A. Lewis; Bernard P. Nusbaum, both of 7800 Red Rd., Miami, Fla. 33143; Harry R. Leeds, 881 Ocean Dr., Key Biscayne, Fla. 33149

[21] Appl. No.: 626,966

[22] Filed: Jul. 2, 1984

[51] Int. Cl.⁴ .............................................. G09B 23/30
[52] U.S. Cl. ..................................................... 434/270
[58] Field of Search ............... 434/262, 266, 267, 268, 434/270, 271, 272, 273, 295; 446/100, 341

[56] References Cited

U.S. PATENT DOCUMENTS

| | | | |
|---|---|---|---|
| 2,019,516 | 11/1935 | Weinberg | 446/100 |
| 2,324,702 | 7/1943 | Hoffmann | 434/272 |
| 3,210,884 | 10/1965 | Sharff | 446/100 |
| 3,789,518 | 2/1974 | Chase | 434/272 |
| 4,195,420 | 4/1980 | Fields | 434/273 |
| 4,203,231 | 5/1980 | Van Note | 434/295 |
| 4,386,917 | 6/1983 | Forrest | 434/267 |
| 4,481,001 | 11/1984 | Graham | 434/267 |
| 4,494,936 | 1/1985 | Stickles | 434/273 |

Primary Examiner—Harland S. Skogquist
Attorney, Agent, or Firm—Jack E. Dominik

[57] ABSTRACT

A new use of an elastomeric material to which a stitchable covering is laminated. More specifically a thin knitted fabric may be laminated to an elastomeric material, optionally a foamed or porous material. Other materials are contemplated. In addition, the invention is directed to forms over which the simulated skin may be placed to reproduce the curvature of the human anatomy. One form has a varying curvature but is essentially square. The various curved portions simulated various curved portions of the skin that would be found on the abdomen, thigh, arm, chest or scalp. Another form is a mannequin simulating the face of a patient and which optionally has means for securing the simulated skin to the mannequin in a life-like configuration which include a simulated mouth and simulated eyes. These in turn assist in anchoring the simulated skin to the mannequin and also provide realistic guidelines for surgical practice. The method contemplates stretching a simulated skin over a form, and then performing various operations which are set forth in a teaching manual by an incision through the outer layer of the skin simulating a penetration of the epidermis, and then penetrating further into the dermis and subcutaneous tissue. Optionally a laminated simulated skin may be provided in which the laminations are color coded to indicate human tissue layers. The color coded laminations will act as an aid to determine the depth of cut and thereby assist the student or practitioner in identifying the various steps to which the cut should be made, and the various removal techniques accompanied by subsequent stitching and closing of the wound.

5 Claims, 5 Drawing Figures

SIMULATED SKIN AND METHOD

FIELD OF INVENTION

The present invention relates to a simulated skin the components of which are epidermis, dermis and subcutaneous tissue and the use of the same in teaching surgical techniques, particularly techniques in opening the epidermis and dermis for surgery in the subcutaneous and lower areas, and then restitching the same.

SUMMARY OF THE PRIOR ART

For years, medical and veterinary students have been taught the basics of surgery, and to a degree anatomy, by using cadavers. Also they can observe during the course of an operation. There is no substitute, particularly where plastic surgery or skin surgery is required, for actually manipulating the surgeon's knife, and restitching the wound. Currently for this purpose exercises are undertaken with pigs feet, and cadaver legs. As to the pigs feet they are a poor substitute for human skin as well as the shape. Cadaver legs are expensive, and also do not have the resiliency that normal live human skin has. It therefore is desirable in teaching the surgeon to have a medium ready for immediate use, particularly which he can have at home and not have to refrigerate or otherwise preserve, in order to practice skin cutting and removal as well as restitching techniques which simulate the actual usage which will be done in live surgery. Even more important, is to provide the student surgeon, or even the skilled surgeon who wishes to experiment with new techniques, with a simulated skin and a form curved to simulate the human anatomy where an intended particular operation can be practiced.

SUMMARY OF THE INVENTION

The present invention is directed to a new use of an elastomeric material to which a stitchable covering is laminated. More specifically a thin knitted fabric may be laminated to a elastomeric material, optionally a foamed or porous material. Other materials are contemplated. In addition, the invention is directed to forms over which the simulated skin may be placed to reproduce the curvature of the human anatomy. One form has a varying curvature but is essentially square. The various curved portions simulated various curved portions of the skin that would be found on the abdomen, thigh, arm, chest or scalp. Another form is a facial form simulating the face of a patient and which optionally has means for securing the simulated skin to the facial form in a life-like configuration which include a simulated mouth and simulated eyes. These in turn assist in anchoring the simulated skin to the facial form and also provide realistic guidelines for surgical practice. The method contemplates forming a simulated skin over a form, and then performing various operations which are set forth in a teaching manual by an incision through the outer layer of the skin simulating a penetration of the epidermis, and then penetrating further into the dermis and subcutaneous tissue. Optionally a laminated simulated skin may be provided in which the laminations are color coded to indicate human tissue layers. The color coded laminations will act as an aid to determine the depth of cut and thereby assist the student or practicioner in identifying the various steps to which the cut should be made, and the various removal techniques accompanied by subsequent stitching and closing of the wound.

BRIEF DESCRIPTION OF THE DRAWINGS

Further objects and advantages of the present invention will become apparent as the following description of an illustrative embodiment with alternatives proceeds, taken in conjunction with the accompanying drawings, in which.

DETAILED DESCRIPTION OF PREFERRED EMBODIMENTS

The Method

Figure 1:
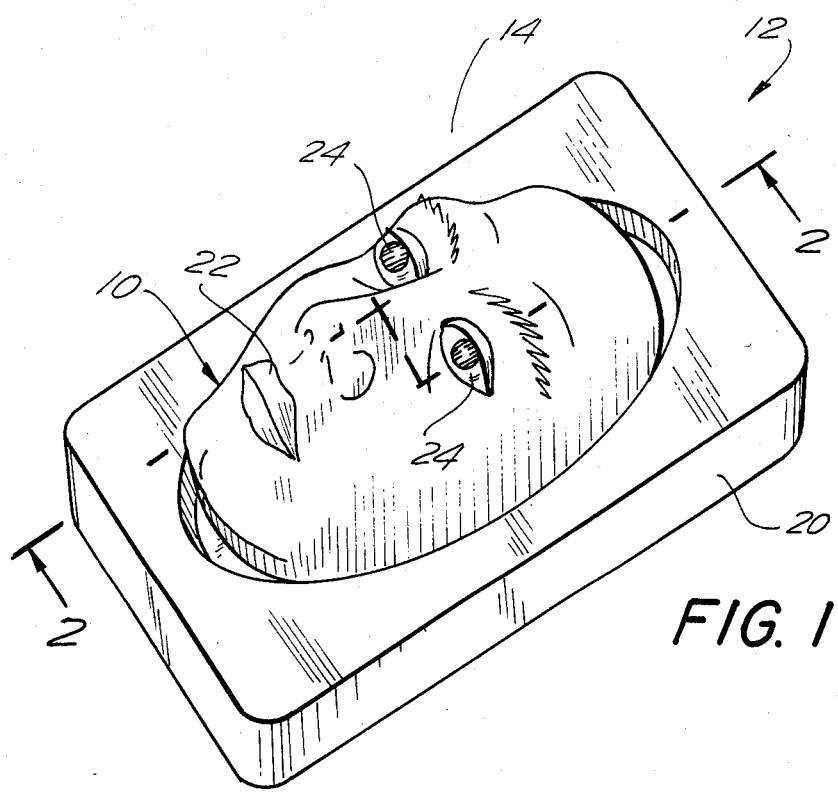
FIG. 1 is a perspective view of a facial form having the subject simulated skin applied to it.
Figure 2:
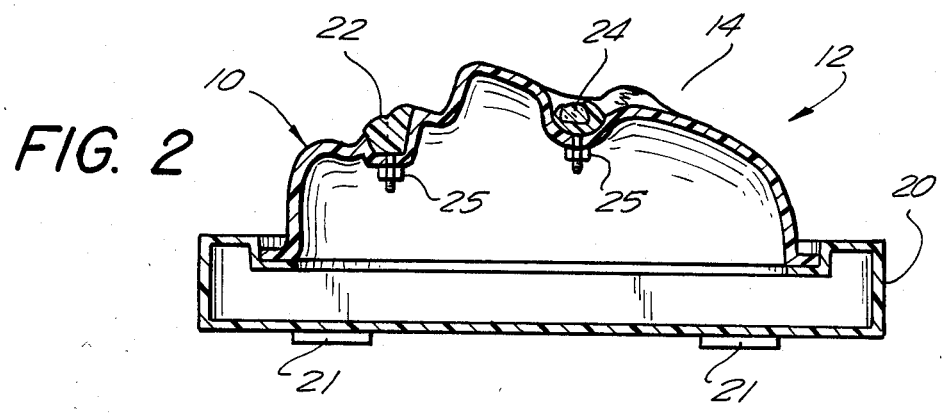
FIG. 2 is a transverse sectional view of the subject facial form indicating the skin and anchoring portions, and staggered in order to show the transverse cut through the eye as well as the mouth and nose.
Figure 3:
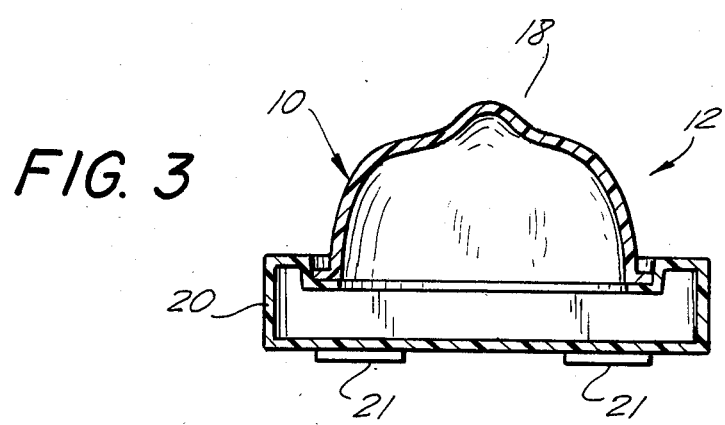
FIG. 3 is a transverse sectional view of a block with the simulated skin stretched on it showing various angles of curvature which can be employed.
Figure 4:
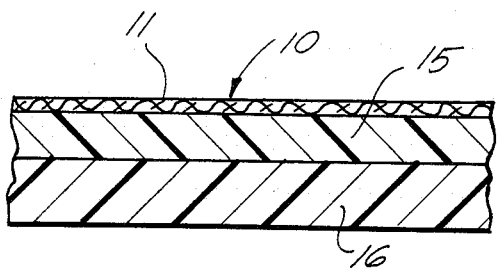
FIG. 4 is a transverse sectional view of a laminated simulated skin identifying the epidermis, dermis and subcutaneous layers.
Figure 5:
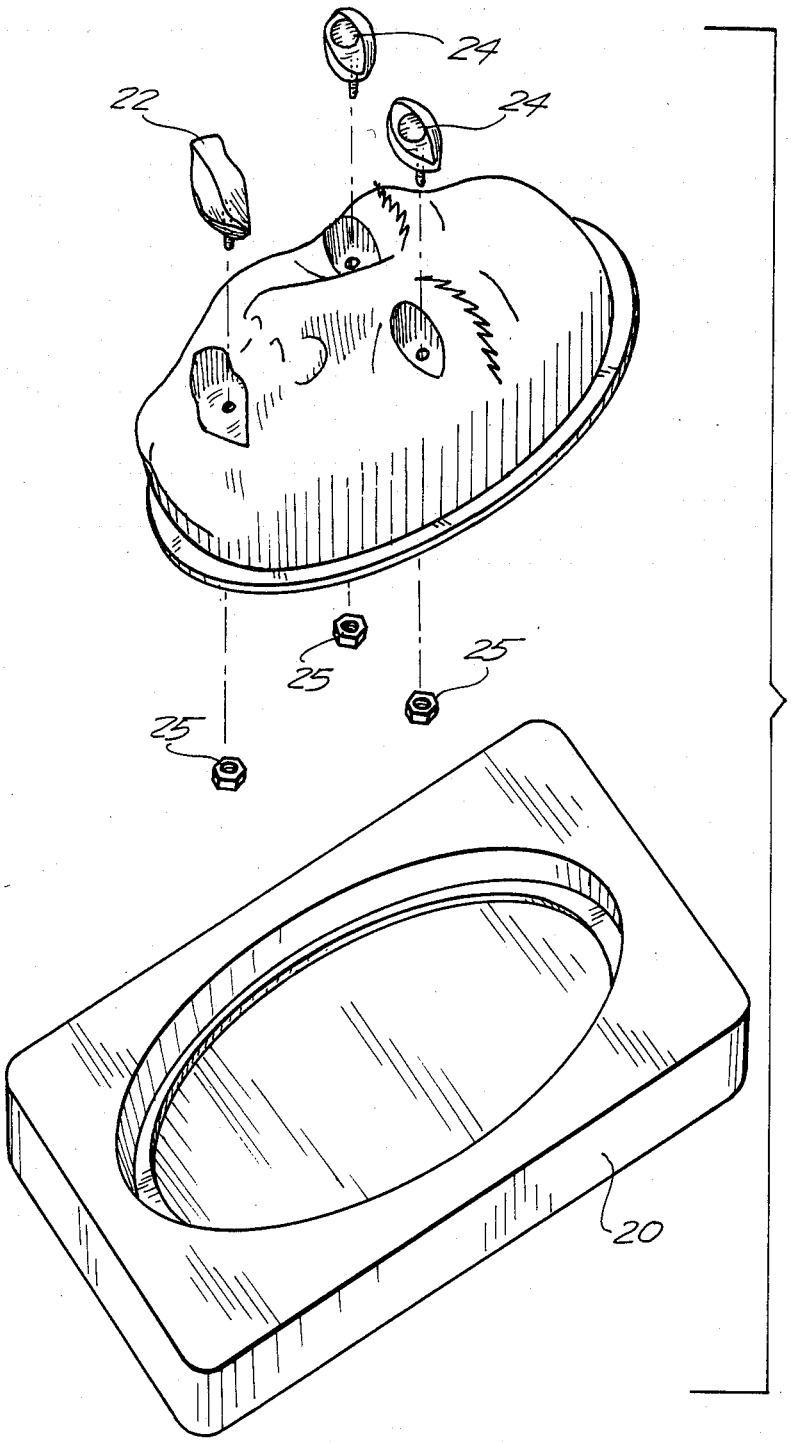
FIG. 5 is an exploded perspective view showing the relationship between the mannequin and curve support surface, and the base.

The method of the present invention contemplates first forming a simulated skin 10 with a stitchable surface 11. In its rudimentary form, the simulated skin is applied to a support form 12 which replicates the shape of the human anatomy. Thereafter by utilizing a surgical text, the student cuts through the skin in the pattern indicated for the particular operation, removes those sections of the skin involved, and then thereafter restitches the wound. The method further contemplates forming the simulated skin over a facial form 14 and thereafter practicing the operation in a life-like simulated area of the face.

The Simulated Skin

The subject simulated skin is formed ideally from an elastomeric thin stitchable layer 11 to replicate the epidermis. Therebeneath is another stitchable elastomeric layer about three-sixteenths of an inch thick corresponding to the dermis 15. A further stitchable elastomeric layer of about five-sixteenths of an inch thickness corresponds to the subcutaneous tissue 16. Each layer may be independently colored to guide the student as to depth of cut. Also the color coding makes the sutures more visible to facilitate performing the surgical procedures. A wide range of colors are available which are selected for functionality and to resemble the layers of tissue in the body.

The epidermis 11 may be formed from an elastomeric sheet of natural rubber or neoprene or a formable stretchable fabric. The elastomeric sheets are about one-thirty-seconds of an inch thick.

The first substrate which simulates the dermis 15 is an elastomer which may or may not be foamed. The second substrate which simulates the subcutaneous tissue 16 may be the same as the first substrate but is thicker to correspond to the human anatomy. The material for forming such substrates include neoprene; polyvinylchloride; latex rubber; polyurethane; styrene butadiene rubber; vinyl nitrile rubber; ethylenepropyleneterpolymer/polyethylene/butyl. As the material is progressively foamed it becomes softer. The density and foaming are proportional for all of the materials to reproduce the given portion of the skin but at all times to maintain stitchability.

For laminating an adhesive must bond permanently and not effect stitchability or elastomeric properties when dry. A knife must readily penetrate the adhesive portion of the boundry. Pliobond #20 from Goodyear Rubber is a good adhesive for most materials. Also KWIKSTICK adhesive from Columbia Cement works well.

In addition to the above, it will be appreciated that certain materials can be blown and a portion inhibited. With such a material the epidermis and dermis are formed in an integral fashion, either by molding on a slab, or other techniques known in the art. Also colored layers may be integrally formed as a single unit. What is important to the invention is that there be a stitchable exterior portion, and a central elastomeric portion which can be penetrated with a knife and stitched.

Forms

As seen in the drawings, two forms 12 have been provided, one a curvilinear form 18 simulating various curved portions of the body, and another in the form of a facial form 14. In each instance the form is molded or vacuum formed in one piece, and then secured to a base member 20 which becomes the mount for securing the simulated skin as well as containing legs 21 therebeneath which can be secured to a work surface by means of clamps, pressure sensitive tabs, or other means. The form can be stamped and also made in one piece.

With the facial form as shown, an additional desirable feature is the provision of a mouth 22 and a pair of eyes 24 in which prongs penetrate the facial form and penetrate the simulated skin. They are secured in place by locking means 25 which may be a nut as shown, or simply bending the prongs of the eyes 24 or mouth 22. This orients the simulated skin so that when it is formed around a periphery to cover the facial form, it will cause the nose to appear lifelike, and all of the skin to condorm to the shape of a head. The eyes and mouth guide the surgeon as well. The laminating adhesive may also be used to secure the skin to the form.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and the appended claims.

What is claimed is:

1. A simulated skin having an uninterrupted surface consisting of,
   a simulated uninterrupted stitchable woven fabric simulated epidermis,
   a simulated uninterrupted dermis laminated to said stitchable woven fabric,
   an adhesive accomplishing the lamination of the woven fabric epidermis to the dermis which is permanently bonded thereto without effecting stitchability and remains readily susceptible of penetration by a knife,
   and a further uninterrupted layer of simulated subcutaneous tissue,
   said uninterrupted subcutaneous tissue being laminated to the simulated dermis in the same fashion as the epidermis is laminated to the dermis,
   and each of said layers being color coded to thereby teach the student how to observe various depths of cut, and permitting undermining in the performance of a simulated operation by both cutting the wound open and then subsequently suturing the same.

2. In the simulated skin of claim 1 above,
   the skin being positioned over a form to simulate various curved portions of the body.

3. In the simulated skin of claim 1 above,
   a facial form to which the skin is secured,
   and means secured to the skin simulating the mouth and eyes.

4. A simulated skin, comprising, in combination,
   a simulated uninterrupted epidermis being a woven stitchable fabric,
   a simulated uninterrupted dermis laminated to said simulated uninterrupted epidermis with a glue which forms a permanent attachment between the two but which can be penetrated by a surgeon's knife along the line of lamination,
   a simulated uninterrupted subcutaneous tissue, said uninterrupted subcutaneous tissue being bonded to the uninterrupted dermis in the same fashion as the epidermis,
   all of the above three layers being susceptible of cutting by a surgeon's knife and thereafter its edges being brought together by means of suturing with known surgical techniques,
   all of the above three layers being color coded to assist in observing depth of cut,
   and a form to which said simulated skin is secured in portable fashion, whereby the entire simulated skin and form combination can be used by a student in the classroom or practicing out of the classroom, and reused for repetative teaching.

5. In the simulated skin of claim 4,
   said uninterrupted epidermis having a thickness of about 1/32 of an inch.

* * * * *